United States Patent [19]
Barnes et al.

[11] Patent Number: 5,711,273
[45] Date of Patent: Jan. 27, 1998

[54] METHOD FOR CONTROLLING THE OPERATION OF A DRIVER CIRCUIT IN RESPONSE TO AN ELECTRICAL FAULT CONDITION

[75] Inventors: Travis E. Barnes; Prasad V. Parupalli, both of Peoria, Ill.

[73] Assignee: Caterpillar Inc., Peoria, Ill.

[21] Appl. No.: 522,214

[22] Filed: Aug. 31, 1995

[51] Int. Cl.⁶ .................................... F02M 47/02
[52] U.S. Cl. ............................ 123/446; 123/198 D
[58] Field of Search ........................ 123/446, 447, 123/467, 457, 458, 198 D

[56] References Cited

U.S. PATENT DOCUMENTS 5,191,867  3/1993  Glassey ........................... 123/446
5,357,912  10/1994  Barnes et al. ..................... 123/357
5,492,099  2/1996  Maddock ........................ 123/198 D
5,564,391  10/1996  Barnes et al. ..................... 123/446
5,586,538  12/1996  Barnes ............................ 123/446

*Primary Examiner*—Thomas N. Moulis
*Attorney, Agent, or Firm*—David M. Masterson

[57] ABSTRACT

In one aspect of the present invention, a method for detecting an electrical fault condition of a driver circuit is disclosed. The driver circuit is used to energize an electrohydraulic device that regulates fluid pressure. The method detects the fault condition, and responsively switches from a normal fluid pressure control strategy to a fault mode fluid pressure control strategy in order to continue to control the fluid pressure during the fault condition.

5 Claims, 3 Drawing Sheets

Fig-2-

METHOD FOR CONTROLLING THE OPERATION OF A DRIVER CIRCUIT IN RESPONSE TO AN ELECTRICAL FAULT CONDITION

TECHNICAL FIELD

This invention relates generally to a method for detecting an electrical fault condition of a driver circuit; and more particularly, to a method that controls the operation of the driver circuit in response to the fault condition.

BACKGROUND ART

Known hydraulically-actuated fuel injector systems and/or components are shown, for example, in U.S. Pat. No. 5,191,867 issued to Glassey et al. on Mar. 9, 1993 and U.S. Pat. No. 5,357,912 issued to Barnes et al. on Oct. 25, 1994. Such systems utilize an electronic control module that regulates the actuating fluid pressure to actuate the fuel injector in order to dispense the fuel. However, injection complications occur with such systems when electrical fault conditions develop in the electronic driver circuit that energizes an electrohydraulic valve that regulates the actuating fluid pressure.

The present invention is directed to overcoming one or more of the problems as set forth above.

DISCLOSURE OF THE INVENTION

In one aspect of the present invention, a method for detecting an electrical fault condition of a driver circuit is disclosed. The driver circuit is used to energize an electrohydraulic device that regulates fluid pressure. The method detects the fault condition, and responsively switches from a normal fluid pressure control strategy to a fault mode fluid pressure control strategy in order to continue to control the fluid pressure during the fault condition.

BRIEF DESCRIPTION OF THE DRAWINGS

For a better understanding of the present invention, reference may be made to the accompanying drawings in which.

BEST MODE FOR CARRYING OUT THE INVENTION

The present invention relates to a fault detection method for an electronic control system for use in connection with a hydraulically actuated electronically controlled unit injector fuel system. More particularly, the present invention controls the operation of a driver circuit in response to detecting an electrical fault condition. The driver circuit is used to energize an electrohydraulic valve that regulates the actuating fluid pressure of the fuel system. Although the present invention is described in relation to a hydraulically actuated electronically controlled unit injector fuel system, the present invention is equally applicable to other types of systems. One example of a hydraulically actuated electronically controlled unit injector fuel system is shown in U.S. Pat. No. 5,191,867, issued to Glassey on Mar. 9, 1993, the disclosure of which is incorporated herein by reference.

Figure 1:
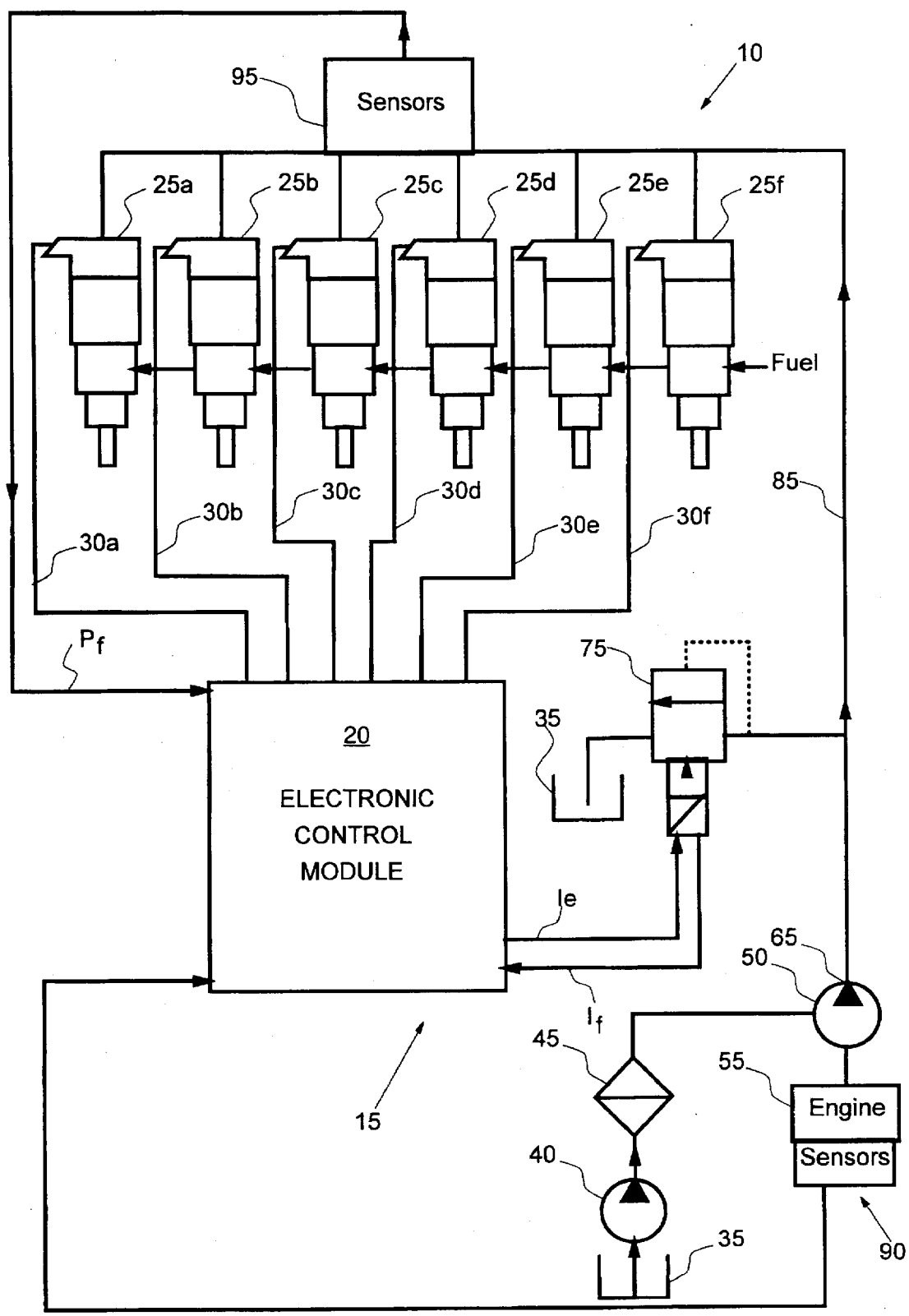
FIG. 1 is a diagrammatic general schematic view of a hydraulically-actuated electronically-controlled injector fuel system for an engine having a plurality of injectors.

Throughout the specification and figures, like reference numerals refer to like components or parts. Referring first to FIG. 1, the electronic control system 10 for a hydraulically actuated electronically controlled unit injector fuel system is shown, hereinafter referred to as the HEUI fuel system. The control system includes an Electronic Control Module 20, hereinafter referred to as the ECM. In the preferred embodiment the ECM is a Motorola microcontroller, model no. 68HC11. However, other suitable microcontrollers may be used in connection with the present invention as would be known to one skilled in the art.

The electronic control system 10 includes hydraulically actuated electronically controlled unit injectors 25a–f which are individually connected to outputs of the ECM by electrical connectors 30a–f respectively. In FIG. 1, six such unit injectors 25a–f are shown illustrating the use of the electronic control system 10 with a six cylinder engine 55. However, the present invention is not limited to use in connection with a six cylinder engine. To the contrary, it may be easily modified for use with an engine having any number of cylinders and unit injectors 25. Each of the unit injectors 25a–f is associated with an engine cylinder as is known in the art. Thus, to modify the preferred embodiment for operation with an eight cylinder engine would require two additional unit injectors 25 for a total of eight such injectors 25.

Actuating fluid is required to provide sufficient pressure to cause the unit injectors 25 to open and inject fuel into an engine cylinder. In a preferred embodiment, the actuating fluid comprises engine oil where the oil supply is found in a sump 35. Low pressure oil is pumped from the oil pan by a low pressure pump 40 through a filter 45, which filters impurities from the engine oil. The filter 45 is connected to a high pressure fixed displacement supply pump 50 which is mechanically linked to, and driven by, the engine 55. High pressure actuating fluid (in the preferred embodiment, engine oil) enters an Injector Actuation Pressure Control Valve 75, hereinafter referred to as the IAPCV. To control the actuating fluid pressure, the IAPCV regulates the flow of actuating fluid to the sump 35, where the remainder of the actuating fluid flows to the injectors 25 via rail 85. Consequently, the rail pressure or actuating fluid pressure is controlled by regulating the flow of fluid to the sump 35. Preferably, the IAPCV is a solenoid actuated valve. Other devices, which are well known in the art, may be readily and easily substituted for the fixed displacement pump 50 and the IAPCV. For example, one such device includes a variable displacement pump. In a preferred embodiment, the IAPCV and the fixed displacement pump 50 permits the ECM to maintain a desired pressure of actuating fluid.

The ECM contains software decision logic and information defining optimum fuel system operational parameters and controls key components. Multiple sensor signals, indicative of various engine parameters are delivered to the ECM to identify the engine's current operating condition. The ECM uses these input signals to control the operation of the fuel system in terms of fuel injection quantity, injection timing, and actuating fluid pressure. For example, the ECM produces the waveforms required to drive the IAPCV and a solenoid of each injector.

Sensor inputs may include: an engine speed sensor 90 that reads the signature of a timing wheel of the engine camshaft to indicate the engine's rotational position and speed to the ECM; and an actuating fluid pressure sensor 95 that delivers a signal to the ECM to indicate the actuating fluid pressure.

The ECM includes a Pulse Width Modulation driver module 200, hereinafter referred to as the PWM driver module. The PWM driver module controls the energization of the IAPCV in order to regulate the actuating fluid pressure. For example, the PWM driver module energizes the IAPCV, which bypasses the actuating fluid directly to the sump 35 to regulate the actuating fluid pressure. The remainder actuating fluid flows in the rail 85 to hydraulically actuate one of more injectors 25.

Figure 2:
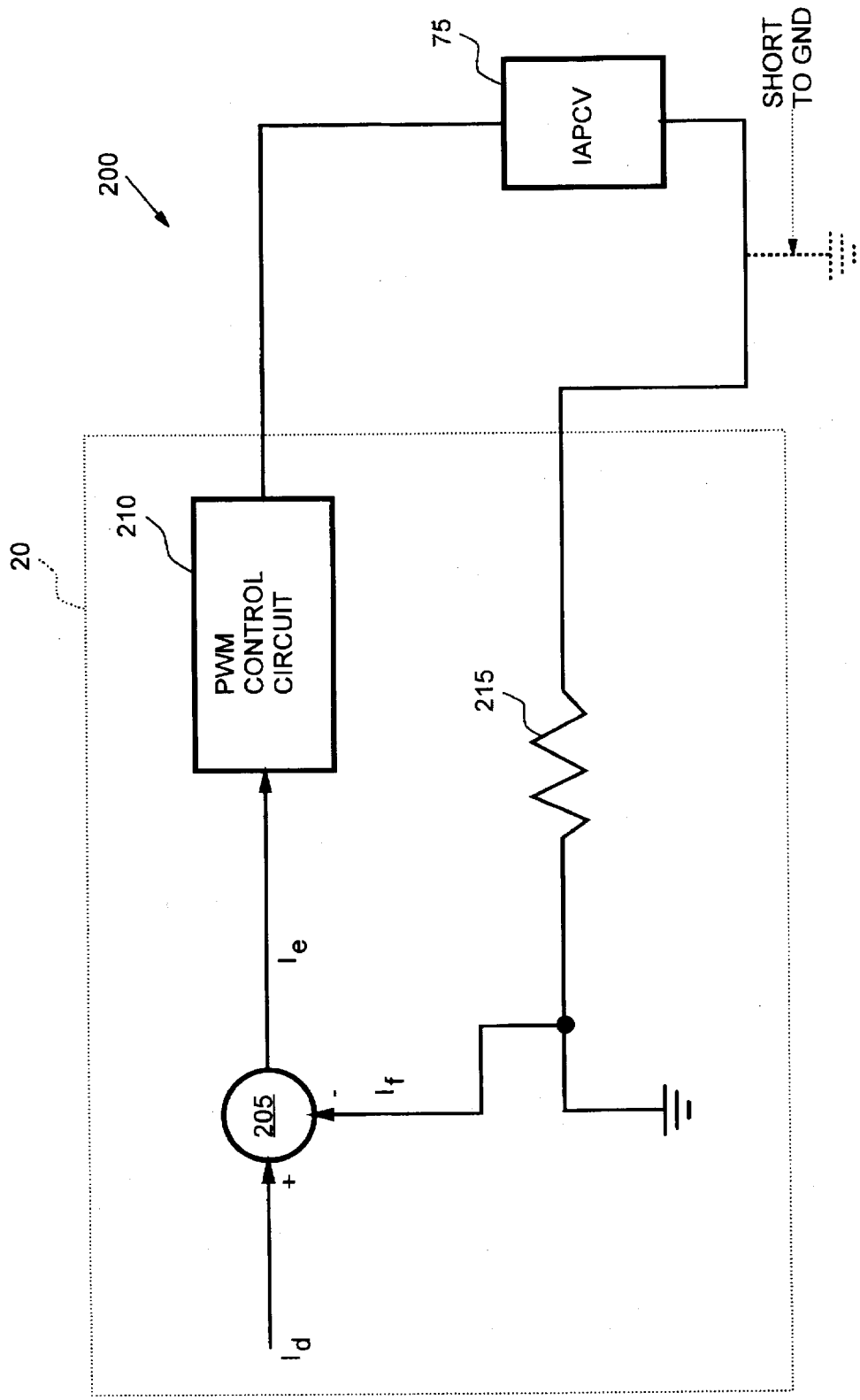
FIG. 2 is an electrical schematic of the drive circuitry associated with the fuel system.

The PWM driver module 200 will now be discussed with reference to FIG. 2. The PWM driver module receives a desired current signal $I_d$, and responsively energizes the IAPCV with a pulse width modulated driving signal. A resistor 215 senses the voltage applied to the IAPCV, and responsively produces a feedback current signal $I_f$. The feedback current signal $I_f$ is compared with the desired current signal $I_d$ at summing block 205, and a current error signal $I_e$ is produced in response to a difference between the compared current signals $I_d$, $I_f$. Accordingly, the current error signal $I_e$ is delivered to a PWM control circuit 210, which controls the duty cycle of the driving signal to reduce the current error signal $I_e$ to zero. Because the IAPCV is a proportional solenoid valve, the duty cycle of the driving signal is proportional to the amount of actuation of the IAPCV, which is proportional to the rail pressure or actuating fluid pressure.

Figure 3:
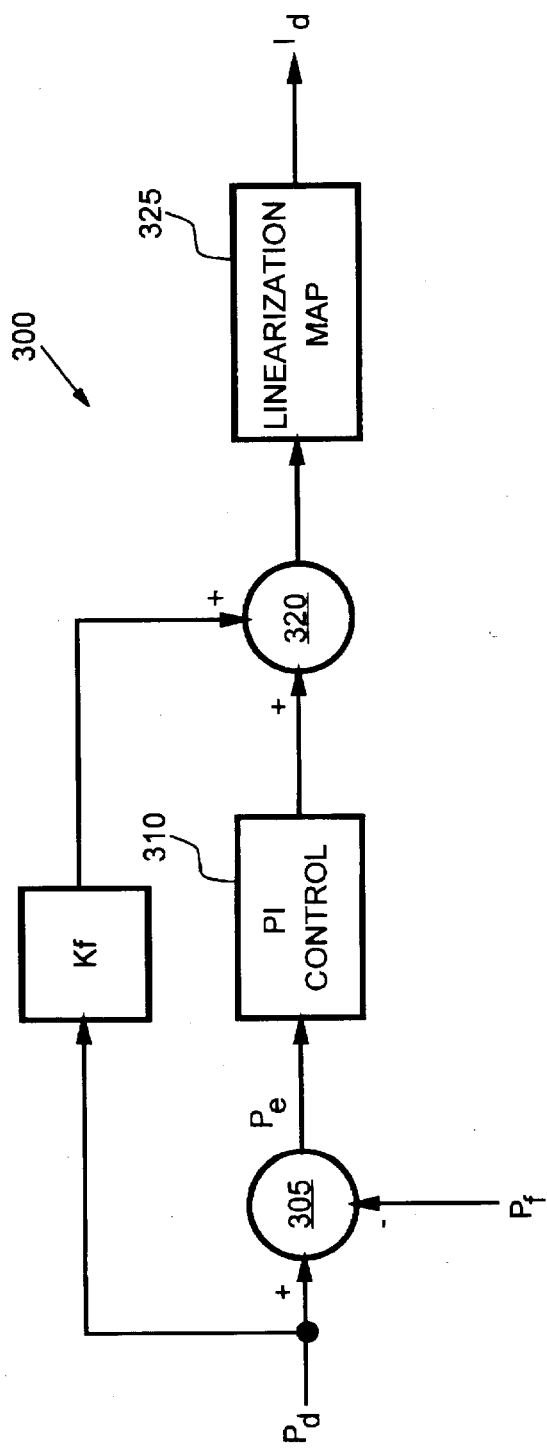
FIG. 3 is a block diagram of an actuating fluid pressure control strategy for the fuel system under normal operating conditions.

The controlling software that determines the magnitude of the actuating fluid pressure supplied to the injector 25, under normal operating conditions, is based on the control strategy shown in FIG. 3. A desired actuating fluid pressure signal $P_d$ in which to actuate one or more fuel injectors is determined in response to one or more engine operating parameters. The desired actuating fluid pressure signal $P_d$ is compared with a measured actuating fluid pressure signal $P_f$ at summing block 305, and an actuating fluid pressure error signal $P_e$ is produced in response to a difference between the compared current signals $Pd$, $Pf$. The actuating fluid pressure error signal $P_e$ is input to a proportional+integral (PI) control block 310, which multiplies the actuating fluid pressure error signal $P_e$ by a proportional and integral gain value. The result of the PI control block is combined with a feed forward term at summing block 320. The value from the summing block 320 is delivered to a valve linearization map in order to produce a desired signal $I_d$. The desired electrical current signal $I_d$ is delivered to the PWM driver module 200. The gain values of the PI control are chosen to produce the appropriate magnitude of the desired electrical current signal $I_d$ to generate the actuating fluid pressure $P_f$ to result in a zero actuating fluid pressure error signal $P_e$. Although a PI control is discussed, it will be apparent to those skilled in the art that other control strategies may be utilized.

The present invention is particularly suited to control the actuating fluid pressure supplied to the injector(s) during electrical fault conditions. For example, one such electrical fault condition is shown by the phantom lines of FIG. 2, which represents a shod circuit-to-ground condition on the return side of the PWM driver module. Under such a condition, the control strategy changes from that shown in FIG. 3 to that shown in FIG. 4. Referring now to the fault mode control strategy 400 of FIG. 4, the feed forward term and the variable linearization table are eliminated, and the proportional and integral gain values of the PI control 410 are decreased by a predetermined amount from that of the normal PI control 310. Because the control strategy of FIG. 4 utilizes relatively low gain values, the control strategy provides for greater controllability of the PWM control circuit 210, than that of the control strategy of FIG. 3, during electrical fault conditions, as described below.

Before the software can take corrective action, that is, before the fault mode control strategy 400 becomes operable, the fault condition must first be detected. When a short on the return side of the PWM driver module occurs, the feedback current signal magnitude will initially fall to zero. This causes the PWM control circuit to produce a driving signal with a 100% duty cycle, which causes the IAPCV to create a very high actuating fluid pressure. Consequently, the normal control strategy (FIG. 3) senses the sudden increase in actuating fluid pressure and reduces the desired current signal magnitude. Once the desired current magnitude is reduced to zero (now equal to the feedback current signal magnitude), the PWM control circuit produces a driving signal with a 0% duty cycle, which causes a very low actuating fluid pressure.

Resultingly, both the driving signal and the actuating fluid pressure oscillates between respective minimum and maximum values. Thus, when the average current of the driving signal oscillates between a minimum and maximum current value, and when the actuating fluid pressure oscillates between a minimum and maximum pressure value, a short on the return side of the PWM driver module is said to be occurring.

Figure 4:
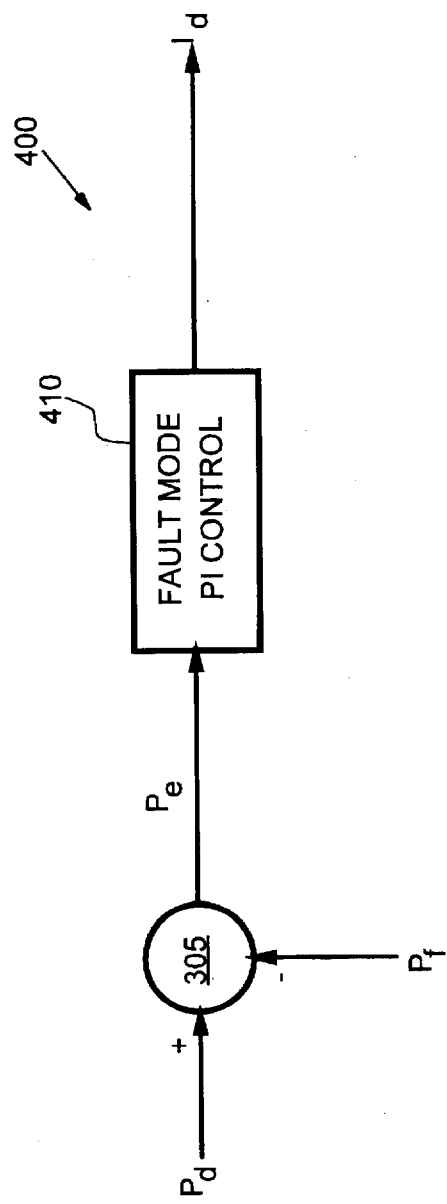
FIG. 4 is a block diagram of an actuating fluid pressure control strategy for the fuel system under electrical fault conditions.

To correct such a fault condition, the ECM switches from the normal control strategy of FIG. 3 to the fault mode control strategy of FIG. 4. Consequently, the ECM software utilizes relatively lower proportional and integral gain values to minimize or limit the average current of the driving signal, which in turn, minimizes or limits the actuating fluid pressure. Consequently, with such corrective action, the fuel system may still remain operable.

Because such ground faults may be intermittent, the present invention detects when such a fault ceases to exist. Consequently, when the desired current magnitude rises above a predetermined value during a predetermined amount of time, the short condition is said to no longer exist. Thus, the ECM software may switch back to normal control strategy from the fault mode control strategy.

Other aspects, objects and advantages of the present invention can be obtained from a study of the drawings, the disclosure and the appended claims.

We claim:

1. A method for controlling the operation of a driver circuit in response to an electrical fault condition, the driver circuit energizing an electrohydraulic device that regulates the pressure of fluid, the method comprising the steps of:

producing a desired fluid pressure signal ($P_d$) indicative of the magnitude of a desired fluid pressure;

receiving the desired fluid pressure signal ($P_d$), and producing a desired current signal ($I_d$);

receiving the desired current signal ($I_d$) and responsively regulating the fluid pressure at the desired fluid pressure;

producing a feedback current signal ($I_f$); and switching from one control strategy to another control strategy to produce the desired electrical current signal ($I_d$) in response to the feedback current signal magnitude being less than a predetermined value.

2. A method, as set forth in claim 1, wherein the electrohydraulic device includes a solenoid actuated valve, the method including the steps of:

sensing the voltage across the solenoid actuated valve and responsively producing the feedback current signal ($I_f$);

comparing the desired electrical current signal ($I_d$) with the feedback current signal ($I_f$) and producing an electrical current error signal ($I_e$) in response to a difference between the compared current signals ($I_d$, $I_f$); and delivering the electrical current error signal ($I_e$) to energize the solenoid actuated valve to produce the desired actuating fluid pressure.

3. A method, as set forth in claim 2, including the steps of:

sensing the actual actuating fluid pressure and producing an actual actuating fluid pressure signal ($P_f$) indicative of the magnitude of the sensed actuating fluid pressure;

comparing the desired actuating fluid pressure signal ($P_d$) with the actual actuating fluid pressure signal ($P_f$) and producing an actuating fluid pressure error signal ($P_e$) in response to a difference between the compared actuating fluid pressure signals ($P_d$, $P_f$); and receiving the actuating fluid pressure error signal ($P_e$) and determining a desired electrical current based on the actuating fluid pressure error signal ($Pe$).

4. A method set forth in claim 3, wherein the desired electrical current signal ($I_d$) is produced in response to multiplying the actuating fluid pressure error signal magnitude by proportional and integral gain values.

5. A method, as set forth in claim 4, including the step of modifying the proportional and integral gain values in response to the feedback current signal magnitude oscillating between a predetermined current range and the actual actuating fluid pressure signal magnitude oscillating between a predetermined pressure range.

* * * * *